United States Patent [19]
Rose et al.

[11] Patent Number: 5,923,880
[45] Date of Patent: *Jul. 13, 1999

[54] METHOD AND APPARATUS FOR GENERATING EXECUTABLE CODE FROM OBJECT-ORIENTED SOURCE CODE

[75] Inventors: John R. Rose, San Jose; Wayne C. Gramlich, Sunnyvale, both of Calif.

[73] Assignee: Sun Microsystems, Inc., Mountain View, Calif.

[*] Notice: This patent is subject to a terminal disclaimer.

[21] Appl. No.: 09/071,635

[22] Filed: May 1, 1998

Related U.S. Application Data

[63] Continuation of application No. 08/499,233, Jul. 7, 1995, Pat. No. 5,790,860.

[51] Int. Cl.$^6$ ........................................................ G06F 9/45
[52] U.S. Cl. ............................................ 395/705; 395/707
[58] Field of Search ...................................... 395/705, 703, 395/707, 708, 709; 707/2

[56] References Cited

U.S. PATENT DOCUMENTS

| | | | |
|---|---|---|---|
| 5,204,960 | 4/1993 | Smith et al. | 395/707 |
| 5,307,499 | 4/1994 | Yin | 395/700 |
| 5,442,792 | 8/1995 | Chun | 395/706 |
| 5,459,868 | 10/1995 | Fong | 395/703 |
| 5,535,391 | 7/1996 | Hejlsberg et al. | 395/709 |
| 5,583,983 | 12/1996 | Schmitter | 395/705 |
| 5,625,822 | 4/1997 | Brett | 395/705 |
| 5,778,354 | 7/1998 | Leslie et al. | 707/2 |

OTHER PUBLICATIONS

Microsoft's Programmer's Guides, Microsoft Visual C++, Development System for Windows, Version 1.0, Programming Techniques, Ch 1, Using Precompiled Headers, pp. 3–20, 1993.

Andy Litman, "An Implementation of Precompiled Headers." Mar. 1993, Software –Practice and Experience, vol. 23, No. 3, pp. 341–350.

P.Z. Ingerman, "Thunks —A Way of Compling Procedure Statements with Some Comments on Procedure Declarations," Jan. 1961, Communications of the Association for Coputing Machinery, vol. 4, No. 1, pp. 55–58.

*Primary Examiner*—Tariq R. Hafiz
*Assistant Examiner*—Peter J. Corcoran, III
*Attorney, Agent, or Firm*—Beyer & Weaver, LLP

[57] ABSTRACT

The present invention provides an improved method and apparatus for generating executable computer code for an application program written in C++ source code. In typical prior art systems, application program source code that has not itself been modified must still generally be recompiled in the event that object-oriented class definitions used by the application program and contained in separate header files have been modified. The methods and apparatus of the present invention reduce the need for such recompilation, by using procedural interfaces to implement object-oriented interfaces at the compiled code level. Thus, in accordance with the present invention, compiled header file code is generated that includes accessors for accessing object instances of the class definitions, each of the accessors being a procedure operative to access the object instances of the corresponding class definition. Compiled application program code is generated which replaces object references with procedure calls to appropriate accessors. In this way, the application program and the header file class definitions remain relatively independent of each other with respect to implementation details, even at the compiled code level.

34 Claims, 4 Drawing Sheets

METHOD AND APPARATUS FOR GENERATING EXECUTABLE CODE FROM OBJECT-ORIENTED SOURCE CODE

This is a continuation application of prior application Ser. No. 08/499,233 filed on Jul. 7, 1995, now U.S. Pat. No. 5,790,861.

FIELD OF THE INVENTION

The present invention relates to the field of compilation and code generation for object-oriented computer languages, and more particularly for the C++ programming language.

BACKGROUND

In recent years, the C++ programming language has gained broad acceptance among programmers on many computer platforms. Many programmers favor C++ because of its object-oriented facilities for distributing and allocating functional behavior among different classes of objects, and for defining clean, concise interfaces for communication among different objects. At the same time, the C++ language lets programmers retain control over many performance-related decisions such as data layout and code inlining. At first blush, C++ may therefore seem to offer an ideal combination of properties: C++ offers high performance comparable to the C programming language, but simultaneously allows programmers to construct layers of abstraction to hide implementation details. Indeed, the C++ language works well for many purposes. For more detailed information regarding the C++ programming language, including the language's object-oriented features, the reader is directed to Ellis & Stroustrup, *The Annotated C++ Reference Manual*, Addison-Wesley (1990), which is incorporated herein in its entirety by this reference.

However, problems can arise when C++ object interfaces are modified over time. An unpleasant phenomenon familiar to every C++ programmer is that if a header file containing class definitions is revised, massive recompilations of application program (or "client") code dependent upon those class definitions becomes necessary. Stated differently, the compiled code of a client is good only for a specific implementation of each class it uses. If a class implementation is changed, the compiled code "breaks" (i.e., becomes incompatible). For example, reversing the declaration order of the real and imaginary components of a C++ class for complex numbers will not affect the language-level semantics of the class, but it will break nearly every client of the class. We call this sensitivity of code to class implementations "brittleness". When compiled codes are brittle, they frequently need to be recompiled, which is a tedious and unwelcome task. (Note: "compiled code" is often known as "object code," but that term is avoided herein because of the special, different meaning of the term "object" in the context of object-oriented programming languages such as C++.)

This massive recompilation problem is symptomatic of a failure to hide information. In the interests of maximizing efficiency, compiled C++ object code typically fails to conceal the details of object implementation information, and thereby forfeits benefits of object-oriented programming such as information hiding, encapsulation, and code reuse. Generally, each access to a class object compiles in an environment which contains full implementation information about that class. The availability of all this implementation information allows very tight code for data structure access, as with C language "structs," but it has a significant disadvantage. That very same tight code must be rearranged if the class changes. The information used at compile time is information which cannot be hidden behind the interface. And less information hiding leads to greater interdependency between clients and services. Similarly, other C++ features, such as modular scoping and overloaded functions, also use implementation information at compile time to generate tightly coupled compiled code, while C++ "templates" have no semantics except as defined by their text replacement at compile-time.

Thus, in practice, the conventional tight coupling of C++ compiled code results in the "brittleness" of compiled code with respect to class definitions. A significant percentage of a project's code may often be contained in the header files which define object classes, and these header files cannot be modified without (potentially) breaking all project binaries, a state of affairs which is only rectified by massive recompilation.

In many current C++ programming environments, a system utility (often known as the "make" utility) is invoked by users to generate compiled code for application programs. The "make" utility typically compares the timestamps of each source code file with the timestamp of any existing, corresponding compiled code file to determine whether the source code (or any header file referenced by the source code) has been modified since the existing compiled code was last generated. "Make" will use existing compiled code files if the source code has not been recently modified, because recompilation is plainly unnecessary in that case. However, relying solely on timestamp-based reasoning means that any change to a header file, no matter how trivial or irrelevant, triggers recompilation of all source files which directly or indirectly use that header file.

In the prior art, some attempts have been made to reduce the need for excessive recompilation by tracking dependencies more accurately. For example, if a comment is changed in a header file, but no actual class definition is changed, it is reasonable to continue to use the contents of client object files without recompilation, and to simply update the timestamps of such object files to indicate that the object file contents are currently valid. However, accurately maintaining dependency information can easily become as costly as recompilation itself. Moreover, dependency tracking fundamentally fails to remove dependencies. For example, if a new virtual function is added to a C++ class, such an addition will change the layout of the virtual function table of that class and all derived classes, and will necessitate recompilation of all client code invoking those classes. The only way to avoid such massive recompilation is to remove dependencies, and not simply track them.

A mechanism that has previously been used in computer science to decouple separate modules in languages such as Algol, Fortran, and Lisp is the procedure call. Typically, procedure calling conventions hide all aspects of the procedure body from the calling client. Only arguments and return values are exchanged, typically through a common program stack. Stated differently, modern procedure calling conventions hide all non-interface information. Consequently, interfacing two programs by means of a procedure call mechanism advantageously allows separate compilation, and eliminates the need for recompilation of the calling program every time purely internal aspects of the procedure are revised. However, conventional wisdom and the prior art have generally shunned using procedure call mechanisms to implement object-oriented operations in C++ code, in part to avoid incurring the run-time performance penalties traditionally associated with executing frequent procedure calls.

The Delta C++ compiler product, offered by Silicon Graphics, Inc. of Mountain View, Calif., is thought to implement one possible strategy for reducing recompilation requirements by removing internal class dependencies. It is thought by the authors that the Delta C++ product encodes some internal, class implementation information in a global data structure or symbol table separate from client code, in the form of stored constant values. This implementation information is then subsequently "inlined" into the client code by the linker at run-time. While the Delta C++ product is thought to make some headway in reducing the need for extensive recompilation, it leaves considerable room for further improvement, particularly with respect to the robustness of the scheme and the limited scope of implementation dependencies removed from client code.

Therefore, an improved methodology for C++ compilation is needed, one which provides full object-oriented benefits such as information hiding even at the compiled code level, but which nevertheless produces compiled code exhibiting acceptable levels of performance and efficiency.

SUMMARY OF THE INVENTION

The present invention provides an improved method and apparatus for generating executable computer code for an application program written in C++ source code. In typical prior art systems, application program source code that has not itself been modified must still generally be recompiled in the event that object-oriented class definitions used by the application program and contained in separate header files have been modified. The methods and apparatus of the present invention reduce the need for such recompilation, by using procedural interfaces to implement object-oriented interfaces at the compiled code level.

In accordance with the present invention, compiled header file code is generated that includes accessors for accessing object instances of the class definitions, each of the accessors being a procedure operative to access the object instances of the corresponding class definition. Compiled application program code is also generated which replaces object references with procedure calls to appropriate accessors. The compiled header file code and the compiled application code are then linked together, thereby generating executable computer code. In this way, the application program and the header file class definitions remain relatively independent of each other with respect to implementation details, even at the compiled code level. As a result, even if header file class definitions are subsequently modified, it will often be possible to generate updated executable code by recompiling the modified header files and relinking the resulting object code, without necessarily recompiling the application program code.

Further features of the present invention include the construction of accessors to carry out functions upon the object instances of associated classes, including reading, writing, and addressing data elements; calling member functions; fetching constant values associated with the class; and recording usage statistics regarding the object instances of the associated class.

DETAILED DESCRIPTION OF THE INVENTION

Notation and Nomenclature

The detailed descriptions which follow are presented largely in terms of algorithmic operations to be performed with respect to data files and bits within a computer memory. Such operations include, among other things, generating, compiling, modifying, comparing, linking, and storing computer source code and compiled code. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Figure 1:
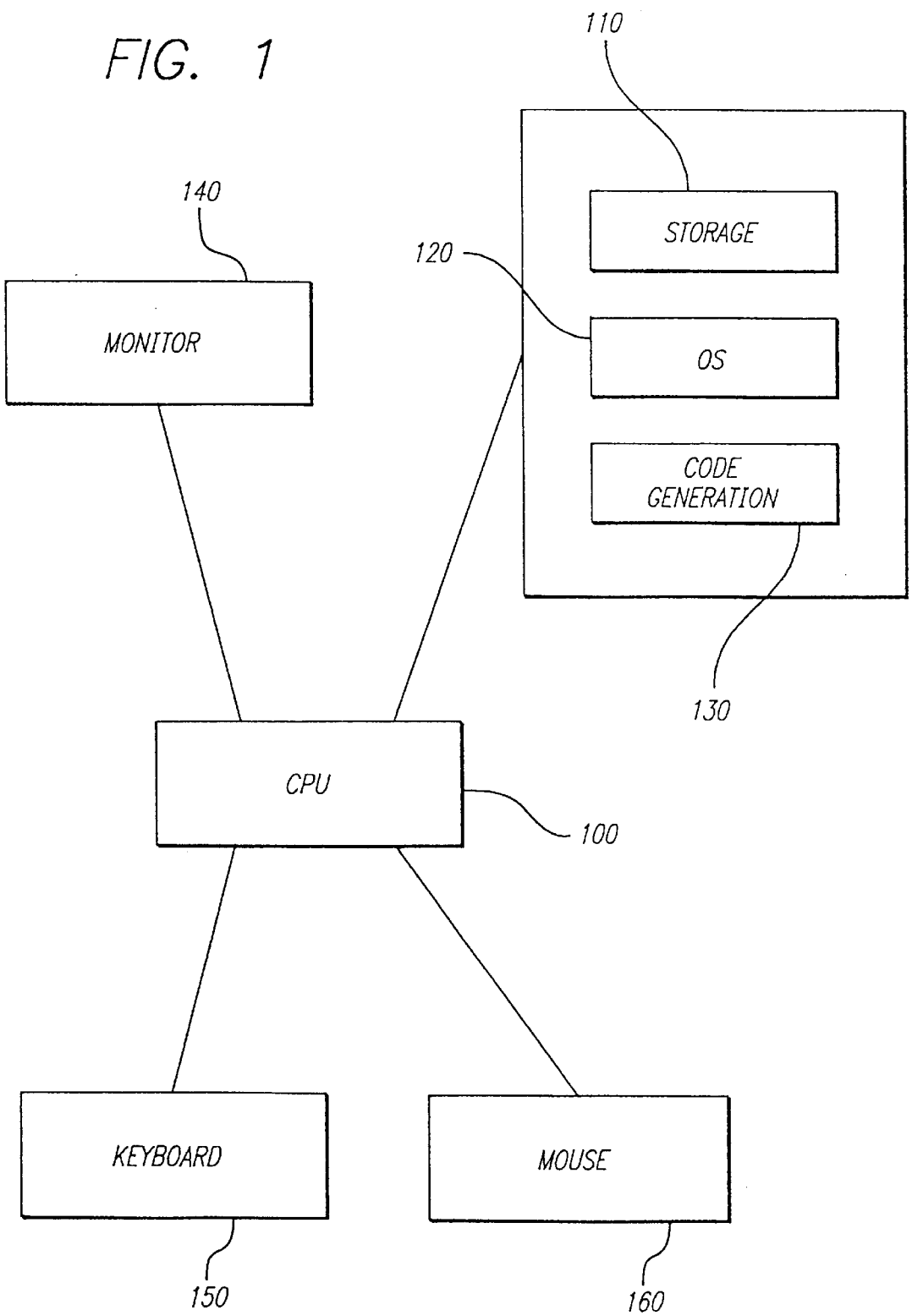
FIG. 1 illustrates preferred digital computer apparatus for use in practicing the present invention.

Useful machines for performing the operations of the present invention include general purpose digital computers or similar devices. FIG. 1 illustrates a general purpose digital computer system suitable for these purposes. Processor 100 is preferably a standard, commercial digital computer microprocessor, such as a Sun SPARC, Intel x86, or Motorolla 680x0 series CPU. Processor 100 runs system software 120 which is stored on storage unit 110, es, a standard internal fixed disk drive, and includes standard operating system software such as the Unix operating system. In accordance with the present invention, system software 120 is augmented by enhanced code generation software 130, for instructing processor 100 to carry out code generation and related operations as described herein below. Display output is transmitted from processor 100 to video monitor 140, while users preferably utilize standard personal computer keyboard 150 and cursor control device 160 (e.g., a mouse or trackball) to enter input commands where necessary, which are then transmitted to processor 100.

Thus, the present invention relates to method steps for operating a computer, such as the digital computer system of FIG. 1, and processing electrical or other physical signals to generate other desired physical signals. In this regard, there should be borne in mind the distinction between the method operations of operating a computer, and the method of computation itself. The invention described herein should be understood in terms of the former. The present invention also relates to apparatus for performing these operations. This apparatus may be specially constructed for the required purposes, or it may comprise a general purpose computer, such as the computer system of FIG. 1, selectively activated or reconfigured by a computer program such as code generation software 130 stored within the computer's memory. The algorithms, methods and apparatus presented herein are not inherently related to any particular computer. Rather, various general purpose machines may be used with programs in accordance with the teachings herein, or it may prove more convenient to construct more specialized apparatus to perform the required method steps. The generally required structure for a variety of these machines will appear to those of skill in the art from the description given below.

The present invention also relates to apparatus such as code generation software 130, comprising a set of computer programs stored on electrical, magnetic, or other physical media, and designed so as to control and instruct a general purpose digital computer such as the system of FIG. 1 to perform the operations described herein. The general structure required for such computer programs will also appear from the description given below, and those of ordinary skill in the art of computer science, and more particularly in the art of designing and implementing computer programming languages, may implement various embodiments of such programs using a wide variety of different programming languages and specific algorithms.

Basic Methodology: Using Accessors

Broadly speaking, one aspect of the present invention is the introduction of procedural interfaces as an advantageous way to implement object-oriented interfaces at the compiled code level. In accordance with the present invention, object-oriented methods are used to provide a structured way for a compiler to assemble procedure definitions from multiple independent sources. Basically, the present methodology provides code generation software 130 which includes an enhanced C++ compiler and related code generation utilities. Wherever a C++ compiler would normally use implementation information from a header file to guide compilation of a particular source-level operation, the enhanced compiler instead generates alternative code which calls one of a set of special procedures at run-time to implement the operation. These special procedures are automatically constructed by the enhanced compiler for each defined object class (or other header file construct), and we refer to them herein as "accessors" since they are used to perform tasks associated with accessing class objects. Accessors are constructed to carry out functions including reading, writing, and addressing data elements; calling member functions; fetching constant values associated with the class; and other functions, as will be discussed further below. For any client code that calls or uses an object of a defined class, the enhanced compiler of code generation software 130 may translate such calls into procedural calls to a corresponding accessor routine. The underlying objective is to use procedural interfaces to decouple C++ class definitions from clients, so that revisions to class definitions do not necessitate recompilation of client program code.

Some further nomenclature regarding accessors is useful and is hereby defined. If accessors are used to encapsulate a class, we say the class is "accessorized." We similarly speak of "accessorizing" the header file(s) containing class definitions. A collection of compiled accessor functions for a header file may be referred to as a "compiled header file." In practice, such a collection may or may not be embodied in a single code file, and may or may not be generated at a single time. Some accessors may be jointly derived from multiple header files.

Figure 2:
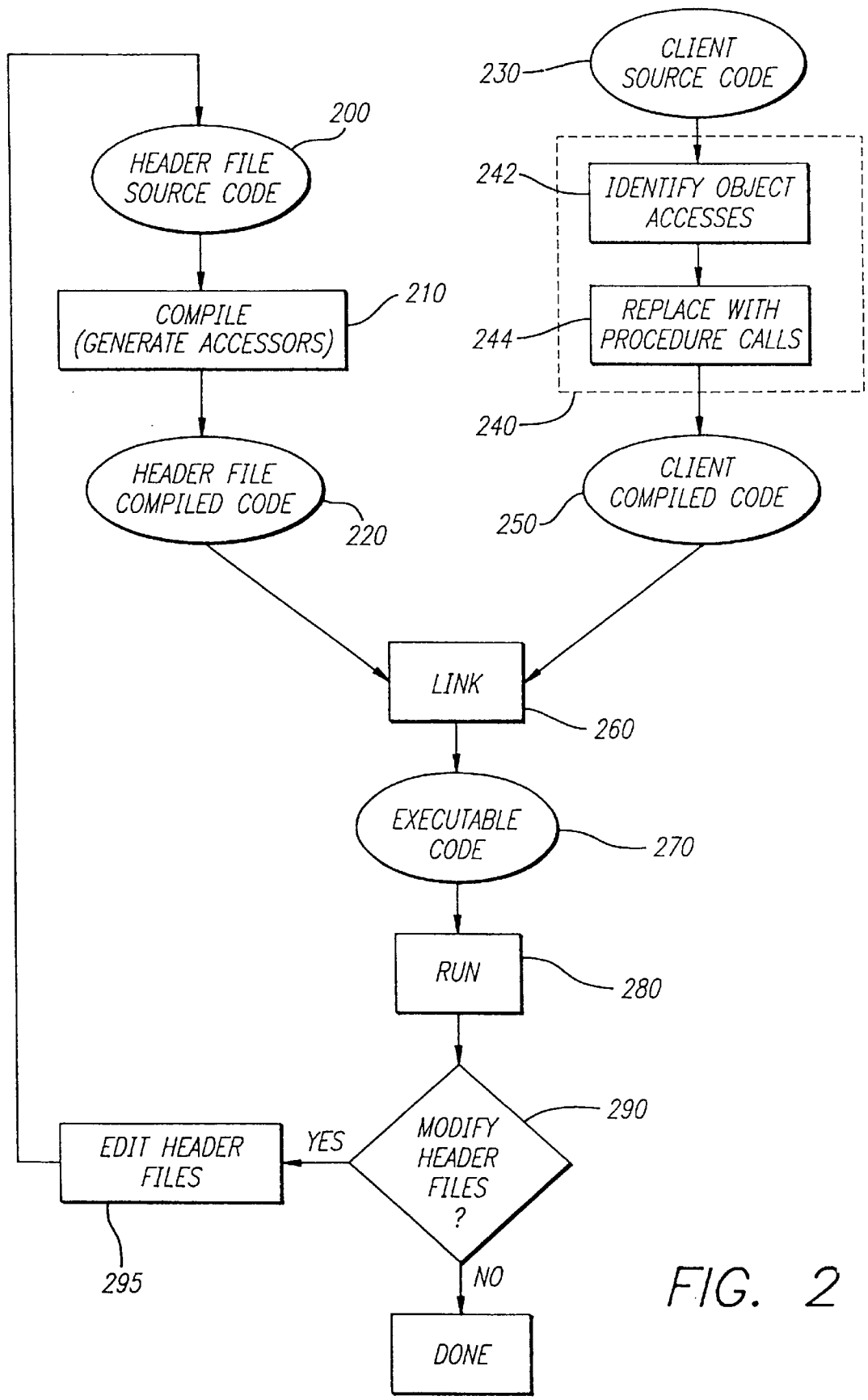
FIG. 2 is a flow diagram representing a basic methodology for compiling and updating C++ program code in accordance with the present invention.

An overview of a preferred methodology for generating compiled code and executable code in accordance with the present invention is further illustrated by the flow diagram of FIG. 2. In the preferred embodiment, the steps of FIG. 2 are performed by code generation software 130, except for execution step 280. (Note that in FIG. 2, rectangles represent steps to be performed, while ovals represent computer code processed by or resulting from these steps.) Oval 200 represents user-specified C++ source code definitions for the various object classes used in a desired client application program. Typically, these class definitions will be stored in one or more "header files" which are included by reference in the client programs that utilize objects of the defined classes. At step 210, each header file is compiled. As part of this step, compiled code accessors are generated by the compiler for each class definition in each accessorized header file. The accessors are preferably straightforward routines, in the form of external procedures, for implementing all forms of access to an object that might be requested by client programs. Equivalently, accessors may be interpretive in nature, i.e., an accessor might act by selecting an appropriate action from compiler-generated tables. Details of a preferred design for accessors are described in a subsequent section below. In any case, the result of compilation step 210 is the generation of compiled code 220, representing an accessorized version of the class definitions specified at step 200. Compiled code 220 is preferably stored in a repository (i.e., a database).

Figure 3:
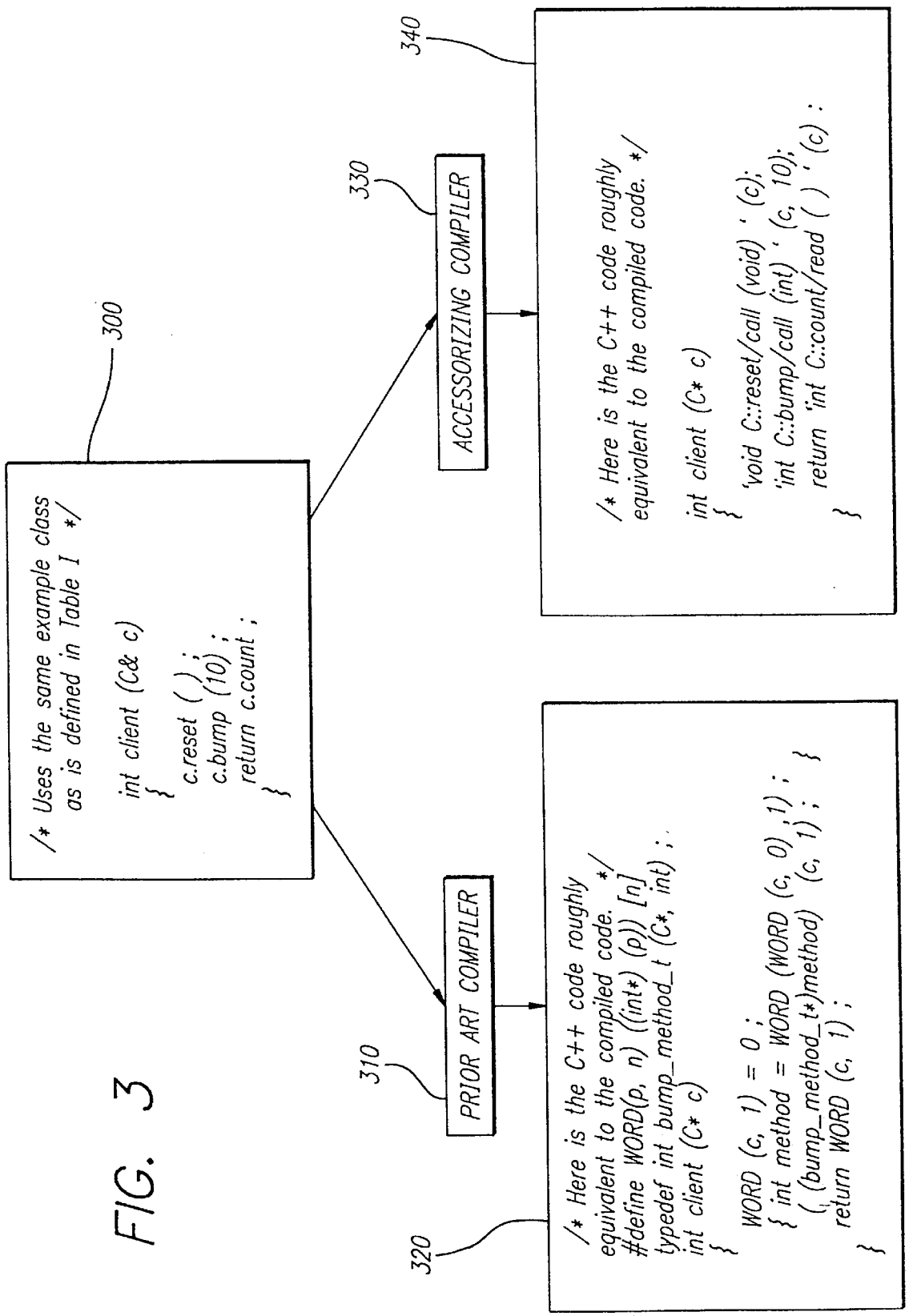
FIG. 3 contains a simple example of client source code, and corresponding compiled code, for purposes of contrasting a prior art approach with a preferred approach in accordance with the present invention.

Client compiled code is also generated. This may be done independently of header file processing, but typically a code generation utility such as "make" is used to initiate processing of the client source code, which in turn subsequently triggers the processing of referenced header files as at step 210. In any case, at step 230, the client source code is defined by the user. At step 240, client code is compiled, which step in turn comprises at least two constituent steps, 242 and 244. At step 242, the compiler of the present invention identifies any code statements within the client source code that access or reference objects belonging to accessorized classes. At step 244, the compiler replaces any such identified code statements with procedure calls (in compiled code form) to appropriate accessors. FIG. 3 illustrates this replacement technique in somewhat more detail. Client code 300 is a fragment of C++ source code including a requested access to an object; in this example, the client code is attempting to fetch the "count" field of the object. As shown in the figure, prior art C++ compiler 310 would typically translate code fragment 300 into something like compiled code fragment 320, which (as those of skill in the art will recognize) incorporates into the compiled code implementation-specific information about the object's class structure, such as the internal location of the "count" field within objects of that class. In contrast, compiler 330, in accordance with the present invention, translates code fragment 300 into something like compiled code fragment 340, which invokes an external procedure—an "accessor"—whose arguments comprise interface information for a standardized calling sequence format, as opposed to internal, implementation-specific information.

The output of compilation step 240 is client compiled code 250. At step 260, client compiled code 250 and class definition compiled code 220 are linked to yield executable code 270. At step 280, executable code 270 can be run, on a standard digital computer system such as the apparatus of FIG. 1.

The objective and result of accessorizing header files is to make object files less brittle. After an accessorized header file is changed, the contents of previously compiled object files are often reusable. Thus, as shown at step 290, the user may elect to modify the class definitions previously specified at step 200. If so, the user edits header file source code as desired, at step 295. The modified header file is then recompiled at step 210 and its compiled code re-linked with client compiled code at step 260 to produce current, executable code. Notably, on this iteration, there is no need for any of the steps involving generation of client code to be repeated (i.e., steps 230, 240, 242, 244, and 250), and thus represents a significant savings over the prior art.

Accessor Interface Design

In accordance with the present invention, accessors provide an interface to class objects for client programs, and keep internal implementation information regarding classes hidden from client code. Generally, our preferred strategy is to conceal from the client as much implementation information as is reasonably possible, thereby reducing the dependency of client code upon header files.

In a preferred embodiment of the present invention, the accessor interface to a class includes the symbolic names for classes and class elements (i.e., names of member data and member functions), as well the return value type for the accessor to each class element. Accessor interfaces need not include implementation information such as: object sizes and layouts; whether a given member is local or inherited; whether a function is inline, static, virtual, and/or pure; inline bodies and constant values; the presence and/or virtuality of base classes; or the absence of an element of a given name. Therefore, broadly speaking, revisions to a header file's source code only necessitate recompilation of client program source code if those revisions change the name or type of an accessorized class member referenced by the client. This is arguably a very desirable result. Client source code which makes use of a particular class element generally should be rewritten and recompiled, in any case, if the type or symbolic name of that class element has been revised in the current class definition.

In order to maintain the correctness of compiled object files, we need only ensure that client source code is recompiled if any changes are made to the names or types of accessorized class elements used by the client program. To detect any such changes in accessor names and types, the well-known technique of "type-safe linkage" is here applied to the accessors by code generation software 130. In particular, code generation software 130 preferably includes a compiler that performs a low-level encoding (or "mangling") of each accessor name in a manner that incorporates the accessor's name, argument(s), and return type. As a result, any incompatibilities between the compiled object files of header files and client programs resulting from changes to accessorized header file names and types can readily be detected by comparing the symbol tables associated with the compiled object files, as will be further described in a later section.

Note that for present purposes, the name of a header file element includes not only the C identifier (or operator token or conversion type) it applies to, but also the scope in which it occurs. The scope is determined by the type of the enclosing object (for constructs like member selection "x.m") or by an explicit prefix (as in "C::x"). Since scopes are related by inheritance, this means that the same member can be accessed in any of the scopes corresponding to derived classes inheriting that member. We therefore give a member as many distinct names as there are scopes from which it can be used. It is not preferable to name a member only according to the scope in which it is defined, because that would cause client object files to "break" whenever class members are moved between classes as a result of refactorization, or when overrides are added or deleted. Making names depend only on the scope of origin would also require the programming environment to track interrelationships between scopes. The name used to access a header file element also depends on the specific source idiom which uses the element. For example, because of the odd rules about operator overloading, the following three expressions have slightly different meanings, and they must be given distinct names to track those meanings independently:

```
x << y
x.operator<<(y)
operator<<(x,y)
```

Likewise, the implicit conversion from a derived to a base class pointer can be invoked by different idioms, each of which have meanings that are independently changeable, hence have separate names:

```
x? derived_ptr: base_ptr          // common base
Base* base_ptr = derived_ptr;     // initialization
(Base*) derived_ptr               // cast
```

In Tables I and II at the end of this Detailed Description, illustrative listings are included for a simple C++ source code class definition, and a corresponding accessorized version in accordance with a preferred embodiment of the present invention. The accessorized code is presented in those listings in C language form for clarity, although in practice compiled code would actually be generated, as discussed earlier in connection with FIG. 2.

Some Illustrative Accessors

Our preference is to name specific accessors using a modified declaration syntax, roughly the same as the compiler uses when reporting diagnostics. Names are fully qualified, and argument types are listed. When significant, return types are also mentioned. Each accessor also is characterized by its "kind", which arises from the syntax of the source construct that uses it. The kind is expressed in our notation by following the name by a slash and the kind. This notation is not accepted by any C++ parser, nor does it need to be. The mangling for accessor names starts with a prefix which encodes the kind, and otherwise is identical with the normal mangling for such symbols. Accessor return types are encoded just like the return types of function pointers.

In general, accessors are preferably used for selected forms of access to selected kinds of objects, as required to avoid the need for recompiling client code as long as classes referenced by the client code are source-compatible. Some illustrative examples follow:

A global data object has an accessor for taking its address:

```
T v;
    T& v/address( )
```

This accessor is needed, because the object file must fail to link if the type of the global variable is changed; this is not normally a property of object files, since variable names do not include their types.

A global constant has a read accessor:

```
const T v;
enum T {v};
    T v/read( )
```

For data members, we have read, write, and address accessors:

```
T C::m;
    T C::m/read( )
    C::m/write(T)
    T& C::m/address( )
    T m/read( ) const
    const T& m/address( ) const
```

If a data member is static, there is also an address accessor for it:
    static T& C::m/address( )
The static data member will be accessed by read and write accessors if it is used with a base object in the source code. This allows a client expression such as "x.m" to be complied once, and continue to work whether the member's status is changed to static or non-static.

A function (whether member or global) has a call accessor. Member functions also have "scoped" call accessors, and operators additionally have "operator" call accessors, e.g.:

```
T C::f(A a, B b);
    T C::f/call(A a, B b)          // c.f(a,b)
    T C::f/scoped(A a, B b)        // c.C::f(a,b)
T operator+(A a, B b);
    T operator+/call(A a, B b)     // operator+(a,b)
    T operator+/operator(A a, B b) // a+b
```

The preferred embodiment manages overloading resolution by means of call accessors whose types reflect actual argument types before resolution. (Note: this decision is similar to treating scope resolution by using accessors whose names reflect scopes of reference rather than of definition.)

In a preferred embodiment, other kinds of accessors may be defined to help manage allocation, construction, destruction, and layout of objects; virtual table layout; and type conversion. Preferably, a const data member will not have a write accessor, nor will there be a "self const" version of the write accessor, although there is for read and address accessors. A reference data member will have a write accessor if the reference is non-const, and independently of whether self is const. A bitfield will not have an address accessor. An array will have only an address accessor.

Selective Use of Accessors

Accessorizing a class does not change its format. Therefore, each client object file can make a separate decision whether to accessorize a given header file. Because accessorizing a class changes nothing about the actual implementation of C++ constructs for any source code file, practitioners can, in principle, make an independent decision to accessorize or not accessorize each particular header file construct in use. Preferably, the decision of whether or not to accessorize is made on a per-header-file basis, because any non-accessorization at all within a given header file leads in practice to timestamp-driven recompilation of all client code dependent upon that header file.

Certain C++ constructs should preferably not be accessorized. For example, certain expressions in C++ code are evaluated at compile time, and the results used in unusual ways. In switches, "case" labels require constant expressions. Array bounds, bitfield widths, and template actual arguments also require constants. In such contexts, if a compiler in accordance with the present invention finds an accessorized constant, it preferably de-accessorizes the name and prints a diagnostic informing the user of this action. Subsequently, any change to the name's value will trigger a recompilation of the object file which de-accessorized that name. The name's value is tracked by the environment in a way similar to the names of accessors; it is encoded by a mangled symbol which mentions the name, its type, and its value. Any read accessor which bears a compile-time constant can be treated in this manner; so can size accessors, which deliver "sizeof" values. The "offsetof" macro, which queries structure layouts, is not specifically accessorized. Use of "offsetof" or its equivalent in a compile-time constant expression will lead to a coarse-grained dependency on the whole class definition. A similar thing happens if the user codes a C-style static initialization of an accessorized struct.

In order to reduce compilation load and optimize performance, private members of a class are preferably not accessorized. Instead, any member function of a class makes direct, non-accessorized access to that class. Object files containing member functions have "coarse-grained dependencies" on the associated class definitions. A "coarse-grained dependency" on a definition is one which requires the entire structure of that definition to remain stable. Macros, typedefs, and templates have similar, coarse-grained dependencies on their definitions. Client programs which use such names depend on the definitions in such a way that changing any token of such definitions necessitates recompilation of those clients. As with dependencies on compile-time constants, this can be managed by encoding the structure of the definition in a mangled symbol, using a signature function to keep the size bounded. It is also possible to use traditional timestamp checking on the enclosing header files.

In summary, when a source file is compiled, dependencies on the compilation environment are each recorded in one of three ways:
1. Header files which are unaccessorized are so noted.
2. Dependencies on specific definitions of constants, classes, macros, typedefs, and templates are registered.
3. Accessor calls are generated which embody assumptions as to the names and types of class elements.

The first kind of dependency is timestamp-based, as in most programming environments today. The other two are mediated by mangled symbols. The last dependency is the most common, and hides the most information.

Correct and Speedy Recompilation

Figure 4:
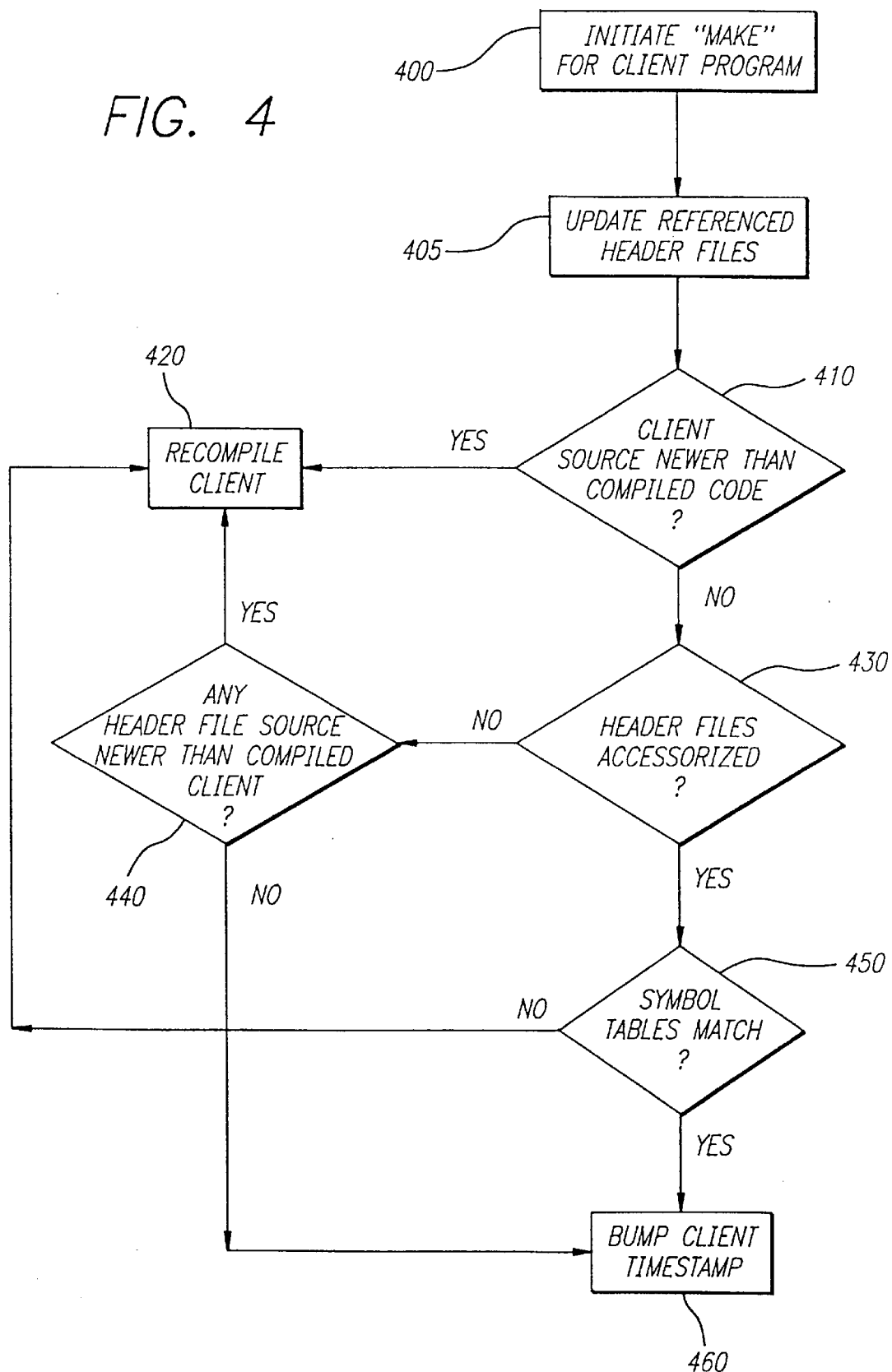
FIG. 4 is a flow diagram representing a preferred process for updating compiled code in accordance with the present invention.

When a client program is initially compiled, accessorized header files are compiled as needed, and are stored in the same system repository as are templates. When the client program is linked, the compiled header files are added to the link line, and supply compiled code for accessors, as described previously in connection with FIG. 2. However, suppose the programmer has modified header files, and then requests regeneration of current compiled code for the application program. In a preferred embodiment of the present invention, the need for recompilation of the client can be detected by a systematic examination of timestamps, symbol uses, and definitions. The flow diagram of FIG. 4 provides an illustration of this selective recompilation process.

At step 400, the compiled code generation process is initiated for the client program. In a preferred embodiment, this step is performed by invoking an enhanced "make" utility, provided as part of code generation software 130. The "make" utility is in some ways similar to the well-known, timestamp-driven utility of that name, but for purposes of the present invention "make" is enhanced to orchestrate the selective recompilation process described in FIG. 4.

At step 405, compiled code for each header file included by reference in the client program is itself brought up to date. A traditional, timestamp-driven, recursive approach can be used to perform this step. Generally, if the source code for a header file referenced directly by the client program is dated more recently than the corresponding compiled header file, then the header file is recompiled and updated accessors are thereby generated. First, however, if the header file in turn includes other header files by reference, then the date-driven updating process is applied to each of those header files, and so on, in a recursive fashion. In the preferred embodiment, the sequence in which header files are processed is derived from the order of source file compilations as determined by "make." Specifically, an accessor is compiled as soon as a source file is scanned which references all the header files which provide source information for that accessor.

If the client source file is determined to be newer than the existing object file, at decision point 410, then the client source is recompiled, at step 420. If not, then if the client program is determined to reference one or more non-accessorized header files, at decision point 430, then the client program is treated in traditional, timestamp-driven fashion. In other words, if non-accessorized header files used by the client program are for any reason timestamped more recently than the existing client compiled code (decision point 440), then the client is recompiled. For client programs using accessorized header files, the symbol table of the client object file is compared with the symbol tables of each compiled header file, at decision point 450. This comparison relies upon the "type-safe" mangling technique discussed earlier. If there is a mismatch (i.e., the client uses an accessor which is either no longer defined, or in which a value dependency has shifted), then the source file is recompiled. Otherwise, the existing client object file can be reused, and code generation software 130 simply "bumps" the compiled code file's timestamp at step 460, marking it as up to date. Consequently, the "make" utility (or any similar, timestamp-driven tools) will perceive the object file as if it had been completely regenerated from scratch. In reality, however, the process of FIG. 4 is generally much quicker than complete regeneration. Because the technique of timestamp bumping effectively tricks "make" into believing that a new version of the object file has been generated, we sometimes call this technique "make believe" recompilation.

In practice, much of the computations concerning compiled code re-use involve the examination and validation of header files, and these calculations are performed repetitively on header files which are included from multiple source files. Therefore, a preferred embodiment of the present invention utilizes a small compiler server to cache the results of such computations in appropriate tables in virtual memory, during a single system build. Consequently, the first "make believe" compilation often takes some time to validate timestamps and regenerate accessors, but subsequent "make believe" compilations consist of a connection to the server, followed by a query to information already cached in the database. The server is preferably programmed to update the template repository and exit after the application is linked; it exists only for a single run of "make".

Minimizing Accessor Overhead

The accessor methodology described above has a tendency, in practice, to lead to the generation of numerous accessors. Consider, for example, that an enumeration type with 10 elements, if nested in a base class with four direct or indirect derived classes, will require (10)(1+4)(1+1)=100 accessor names. The last term reflects the fact that an enumeration can be accessed either via scoping or via selection notation, and that the two notations have slightly different meanings. Indeed, it is not uncommon for the symbol table of a compiled header file to exceeds the size of its compiled code. The volume of symbols to be processed can lead to some sluggishness at link time. The size of an accessorizing application is also noticeably larger. For applications which are large to start with, the extra object files, plus dependency management information, can add a few megabytes to one's disk requirements. One way of dealing with undesirable accessor overhead is to create a final, production version of an application by recompiling the entire application using a traditional C++ compilation process, without accessors. In this way, the benefits of accessors are at least enjoyed for the duration of the initial development process, when revisions and updates to class definitions are most likely.

Another strategy in accordance with the present invention modifies the code generation software 130 so as to generate compiled application program code that includes procedure calls to accessors as well as non-procedural, inlined access to referenced objects. A "footnote" or special code alerts the linker of code generation software 130 that one of the two formulations—accessorizing or inlined—must be selected. The linker will preferably select the inlined version in the event that timestamps indicate no modification to the relevant header file. In this way, the performance price associated with accessors is paid only where full-blown recompilation of the client application code would otherwise be necessary. An even more aggressive variation of this strategy would further enhance the linker of software 130, such that the linker would dynamically modify and use the "footnoted" inlined code, in the event of relatively modest changes to a header file class definition. For example, using symbol tables, the linker can preferably compute simple changes in the offset of a particular field within objects of a given class, and can update the offset value contained in the inlined code so as to address the field correctly.

As those of skill in the art will recognize, the strategies just described will eliminate the performance overhead of accessors in some cases, but will also add some overhead to the performance of the linker. Because of this performance tradeoff, the balance of execution performance versus code generation performance should be considered by the practitioner in light of the particular context that the practitioner faces, in deciding whether and how aggressively to pursue the overhead minimizing strategies just described.

Using Accessors To Gather And Manage Information

In a preferred embodiment of the present invention, accessors can be advantageously used as "hooks" to perform internal management functions associated with object access. These functions may include managing the details of object lifetime, verifying invariants or making consistency checks, and gathering usage statistics or other run-time information. For example, the code excerpt contained in Table III illustrates an accessor that increments a counter each time that an associated object field is set to a negative value. Collecting usage statistics of this nature could help program designers determine optimal data typing for class fields, or might otherwise inform programming design choices, as will be appreciated by those of ordinary skill in the relevant arts.

TABLE I

A SAMPLE C++ CLASS DEFINITION

```
class C {
public:
    void reset (int new_count = 0)
        { count = new_count; }
    virtual int bump (int diff = 1)
        { return count += diff; }
    int count;
};
```

TABLE II

AN ACCESSORIZED VERSION OF THE SAMPLE C++ CLASS

```
__OAaoBCszvT__Ui:              ! static unsigned int C::/size()
    jmp      %o7+8
    mov      8,%o0
__OAcoBCdtv:                   ! C::~C/call(void)
    jmp      %o7+8
    nop
...
__OAcoBCctv:                   ! C::C/call(void)
    save     %sp,-96,%sp
    set      __OdBCG__vtbl,%10    ! C::__vtbl
    st       %10,[%i0+0]
    jmp      %i7+8
    restore
...
__OAcoBCasRC6BC__R6BC:         ! C& C::operator=/call(const C&)
    save     %sp,-96,%sp
    ld       [%i1+4],%10
    st       %10,[%i0+4]
    jmp      %i7+8
    restore
__OAcoBCasR6BC__R6BC =   __OAcOBCasRC6BC__R6BC   ! C& C::operator =/call(C&)
__OASoBCasRC6BC__R6BC =  __OAcOBCasRC6BC__R6BC   ! C& C::operator =/scoped(const C&)
__OAsoBCasR6BC__R6BC =   __OAcOBCasRC6BC__R6BC   ! C& C::operator =/scoped(C&)
__OAvfBCFcountv__i:            ! int C::count/read()
    jmp      %o7+8
    ld       [%o0+4],%o0
__OAvfBCFcountvK_i =     __OAvfBCFcountv__i      ! int C::count/read(void) const
__OAafBCFcountv__Ri:           ! int& C::count/address()
    jmp      %o7+8
    add      %o0,4,%o0
__OAafBCFcountvK__RCi =  __OAafBCFcountv__Ri     ! const int& C::count/address(void) c
__OAvfBCFcounti__v:            ! C::count/write(int)
    jmp      %o7+8
    st       %o1,[%o0+4]
__OAcfBCFresetv__v:            ! void C::reset/call(void)
    jmp      %o7+8
    st       %g0,[%o0+4]
__OAsfBCFresetv__v =     __OAcfBCFresetv__v      ! void C::reset/scoped(void)
__OAcfBCFreseti__v:            ! void C::reset/call(int)
    jmp      %o7+8
    st       %o1,[%o0+4]
__OAsfBCFreseti_v =      __OAcfBCFreseti__v      ! void C::reset/scoped(int)
__OAcfBCEbumpv__i:             ! int C::bump/call(void)
    save     %sp,-96,%sp
...
    restore
__OAcfBCEbumpi__i:             ! int C::bump/call(int)
    save     %sp,-96,%sp
...  do virtual calling sequence
    restore
__OAsfBCEbumpv__i:             ! int C::bump/scoped()
    save     %sp,-104,%sp
...  ! do virtual calling sequence
    restore
__OAsfBCEbumpi__i:             ! int C:::bump/scoped(int)
    save     %sp,-112,%sp
...  ! code for actual function body
    restore
```

TABLE III

AN ACCESSOR FOR GATHERING USAGE STATISTICS

```
void __OAvfBCFcounti__v(C* c,int v)    /* void C::count/write(int) */
{
  assert(v >= 0);                       /*check invariant*/
  c->count = v;
  hist__collect("C::v", v);             /*accumulate usage info*/
}
```

Other Variations

A preferred embodiment has now been described in order to illustrate possible techniques for implementing the present invention and as an aid to those of ordinary skill in the art, not as a limitation on the scope of the invention. Numerous variations and modifications within the spirit of the present invention will of course occur to those of ordinary skill in the art in view of the preferred technology that has now been disclosed. Such variations, as well as any other systems embodying any of the following claims, all remain within the scope of the present invention:

We claim:

1. A method, using a digital computer, for generating executable computer code for an application program, said application program including at least one reference to one or more header files, each of the header files comprising one or more class definitions, each of said class definitions deeming a class of object instances, and said application program further comprising a plurality of source code instructions, said source code instructions including one or more references to one or more object instances of the class definitions, and said method comprising the steps of:

compiling the header files, thereby generating compiled header file code comprising one or more accessors, each of the accessors being a procedure operative to access the object instances of an associated one of the class definitions;

compiling the application program, thereby generating compiled application program code corresponding to the plurality of source code instructions, said compiled application program code including one or more procedure calls to one or more of the accessors, each of said procedure calls corresponding to the one or more references in the source code instructions to one or more object instances of the class definitions;

linking the compiled header file code and the compiled application program code;

modifying one or more header files;

recompiling the one or more modified header files thereby generating recompiled header file code;

selectively recompiling only those portions of the application program which are affected by the recompiled header files; and linking the recompiled header file code and the compiled application code, and the recompiled application program code if any, thereby generating the executable computer code.

2. The method of claim 1, wherein the step of modifying one or more header files includes the step of modifying one or more class definitions therein, and wherein the step of selectively recompiling includes recompiling those portions of the application program which include one or more references to class definitions that have been modified in the modified header files.

3. The method of claim 2, wherein the compiled application code is stored in an application program code file, said file having a timestamp reflecting said file's most recent modification, and wherein the method further includes the step of incrementing the timestamp without otherwise recompiling the application program code file.

4. The method of claim 2, wherein the step of selectively recompiling is carried out independent of user selection.

5. The method of claim 1, wherein the class definitions comprise a collection of symbolic names and data types, and wherein each of the procedure calls to the accessors specifies one or more of the symbolic names and data types of the class definition associated with the accessor.

6. The method of claim 1, wherein the accessors include one or more accessors for reading, writing, and addressing the object instances of the associated class definition.

7. The method of claim 1, wherein the accessors include one or more accessors for calling member functions on the object instances of the associated class definition.

8. The method of claim 1, wherein the accessors include one or more accessors for performing type conversions on the object instances of the associated class definition.

9. The method of claim 1, wherein the accessors include one or more accessors for fetching one or more constant values from the object instances of the associated class definition.

10. The method of claim 1, wherein the accessors include one or more accessors for fetching one or more size measurements from the object instances of the associated class definition.

11. The method of claim 1, wherein the accessors include one or more accessors for recording usage statistics regarding the object instances of the associated class definition.

12. The method of claim 1, wherein the accessors include one or more accessors for checking invariance regarding the object instances of the associated class definition.

13. An apparatus for generating executable computer code for an application program, said application program including at least one reference to one or more header files, each of the header files comprising one or more class definitions, each of said class definitions defining a class of object instances, and said application program further comprising a plurality of source code instructions, said source code instructions including one or more references to one or more object instances of the class definitions, said apparatus comprising:

a compiler operative to generate compiled header file code and recompiled header file code after a header file has been modified by a user, said compiled and recompiled header file code comprising one or more accessors, each of the accessors being a procedure operative to access the object instances of an associated one of the class definitions, said compiler further operative to generate compiled application program code corresponding to the plurality of source code instructions, said compiled application program code including one or more procedure calls to one or more of the accessors, each of said procedure calls corresponding to the one or more references in the source code instructions to one or more object instances of the class definitions, said compiler further operative to selectively recompile and generate recompiled application program code for only those portion of the application program which are affected by the recompiled header code; and a linker operative to link the recompiled header file code and the compiled application program code, and recompiled application program code if any produced by the compiler, thereby generating the executable computer code.

14. The apparatus of claim 13, further including a code generation utility program selectively operative to invoke the compiler and the linker, wherein the utility program is further operative to determine whether the compiled application program code has previously been generated, and to avoid invoking the compiler to generate the recompiled application program code when said compiled application program code has previously been generated, even if one or more of the header file class definitions was modified after the compiled application program code was previously generated.

15. The apparatus of claim 14, further including a storage file receiving and storing the compiled application program code, said storage file having a timestamp indicating said file's most recent modification, and said utility program further being operative to increment the timestamp in the event that said utility program avoids invoking the compiler to generate the recompiled application program code.

16. The apparatus of claim 13 wherein the compiler is operative to recompile header file code in which class definitions have been modified by a user, and wherein the compiler is operative to selectively recompile those portions of the application program code which include one or more references to class definitions that have been modified in the modified header file code.

17. The apparatus of claim 16, wherein the compiler is operative to selectively recompile independent of user selection.

18. The apparatus of claim 13, wherein the class definitions comprise a collection of symbolic names and data types, and wherein each of the procedure calls to the accessors specifies one or more of the symbolic names and data types of the class definition associated with the accessor.

19. The apparatus of claim 13, wherein the accessors include one or more accessors for reading, writing, and addressing the object instances of the associated class definition.

20. The apparatus of claim 13, wherein the accessors include one or more accessors for calling member functions on the object instances of the associated class definition.

21. The apparatus of claim 13, wherein the accessors include one or more accessors for performing type conversions on the object instances of the associated class definition.

22. The apparatus of claim 13, wherein the accessors include one or more accessors for fetching one or more constant values from the object instances of the associated class definition.

23. The apparatus of claim 13, wherein the accessors include one or more accessors for fetching one or more size measurements from the object instances of the associated class definition.

24. The apparatus of claim 13, wherein the accessors include one or more accessors for recording usage statistics regarding the object instances of the associated class definition.

25. The apparatus of claim 13, wherein the accessors include one more accessors for checking invariance regarding the object instances of the associated class definition.

26. A computer program product comprising a computer-usable medium, and computer-readable program code embodied in said medium for generating executable computer code for an application program, said application program including at least one reference to one or more header files, each of the header files comprising one or more class definitions, each of said class definitions defining a class of object instances, and said application program further comprising a plurality of source code instructions, said source code instructions including one or more references to one or more object instances of the class definitions, said computer-readable program code comprising:

computer-readable header file compiler code configured to cause a computer to generate compiled header file code comprising one or more accessors, each of the accessors being a procedure operative to access the object instances of an associated one of the class definitions, said computer-readable header file compiler code further configured to cause a computer to generate recompiled header file code after a header file has been modified by user;

computer-readable application compiler code configured to cause a computer to generate compiled application program code corresponding to the plurality of source code instructions, said compiled application program code including one or more procedure calls to one or more of the accessors, each of said procedure calls corresponding to the one or more references in the source code instructions to one or more object instances of the class definitions, said computer-readable application compiler code further configured to cause a computer to recompile and generate recompiled application program code for only those portions of the application program which are affected by the recompiled header files; and computer-readable linker code configured to cause a computer to link the compiled header file code and the compiled application program code, and the recompiled application code if any, thereby generating the executable computer code.

27. The computer program product of claim 26, further comprising computer-readable utility code configured to cause a computer to execute selectively the computer-readable header file compiler code, the computer-readable application compiler code, and the computer-readable linker code, wherein the computer-readable utility code is further configured to cause a computer to avoid re-generating the recompiled application program code if said compiled application program code has previously been generated even if one or more of the header file class definitions was modified after the compiled application program code was previously generated.

28. The computer program product of claim 26 wherein the computer-readable header file compiler code is configured to recompile those portions of the application program which include one or more references to class definitions that have been modified in the modified header files by user.

29. The computer program product of claim 26, wherein the computer-readable application compiler code is configured to selectively recompile independent of user selection.

30. A method for providing a mechanism for generating executable computer code for an application program, said application program including at least one reference to one or more header files, each of the header files comprising one or more class definitions, each of said class definitions defining a class of object instances, and said application program further comprising a plurality of source code instructions, said source code instructions including one or more references to one or more object instances of the class definitions, and said method comprising the steps of:

providing a first mechanism for compiling the header files, said first mechanism being operable to generate compiled header file code comprising one or more accessors, each of the accessors being a procedure operative to access the object instances of an associated one of the class definitions, said first mechanism further for recompiling the header files after the header files have been modified by a user, thereby generating recompiled header file code;

providing a second mechanism for compiling the application program, said second mechanism being operable to generate compiled application program code corresponding to the plurality of source code instructions, said compiled application program code including one or more procedure calls to one or more of the accessors, each of said procedure calls corresponding to the one or more references in the source code instructions to one or more object instances of the class definitions, said second mechanism further for selectively recompiling only those portions of the application program which are affected by the recompiled header files; and providing a third mechanism for linking the compiled header file code and the compiled application program code, and for linking the recompiled header file code and the compiled application code, and the recompiled application program code if any, said third mechanism being thereby operable to generate the executable computer code.

31. A method, using a computer, for generating executable computer code for an application program, said application program including at least one reference to one or more header files, each of the header files comprising one or more class definitions, each of said class definitions deeming a class of object instances, and said application program further comprising a plurality of source code instructions, said source code instructions including one or more references to one or more object instances of the class definitions, the method comprising the steps of:

compiling the one or more header files which generates compiled header file code;

compiling the application program which generates compiled application program code, wherein the application program and the compiled application program code each include a timestamp;

linking the compiled header file code and the compiled application program code;

recompiling the one or more header file code which generates recompiled header file code;

selectively recompiling one or more portions of the application program which are affected by the recompiled header file code, selective recompilation including the steps of, comparing the timestamp of the application program to the timestamp of the compiled application program code timestamp, and recompiling all of the application program if the timestamp of the application program is later than the timestamp of the compiled application program code, and selectively recompiling the one or more portions of the application program which are affected by the recompiled header file code if the timestamp of the application program is not later than the timestamp of the compiled application program code.

32. The method of claim 31, wherein the application program and the recompiled header file bode both include a symbol table, and the step of recompiling one or more portions of the application program further includes:

comparing the symbol table of the application program to the symbol table of the recompiled header file code if the timestamp of the application program is not later than the timestamp of the compiled application program code.

33. The method of claim 32, wherein the step of recompiling one or more portions of the application program further includes:

recompiling all of the application program if the symbol table of the application program and the symbol table of the recompiled header file code are mismatched.

34. The method of claim 32, wherein the step of recompiling one or more portions of the application program further includes:

updating the timestamp of the compiled application program code if the symbol table of the application program and the symbol table of the recompiled header file code match, whereby the application program is not recompiled.

* * * * *

UNITED STATES PATENT AND TRADEMARK OFFICE
CERTIFICATE OF CORRECTION

PATENT NO. : 5,923,880
DATED : July 13, 1999
INVENTOR(S) : Rose et al.

It is certified that error appears in the above-identified patent and that said Letters Patent is hereby corrected as shown below:

On front page of patent in section [63], under Related U.S. Application Data, should be "Pat. No. 5,790,860." to --Pat. No. 5,790,861--

Signed and Sealed this

Eleventh Day of July, 2000

*Attest:*

Q. TODD DICKINSON

*Attesting Officer*     *Director of Patents and Trademarks*